No. 879,234. PATENTED FEB. 18, 1908.
C. AALBORG.
ELECTRIC CIRCUIT CONTROLLER.
APPLICATION FILED APR. 4, 1906.
3 SHEETS—SHEET 1.
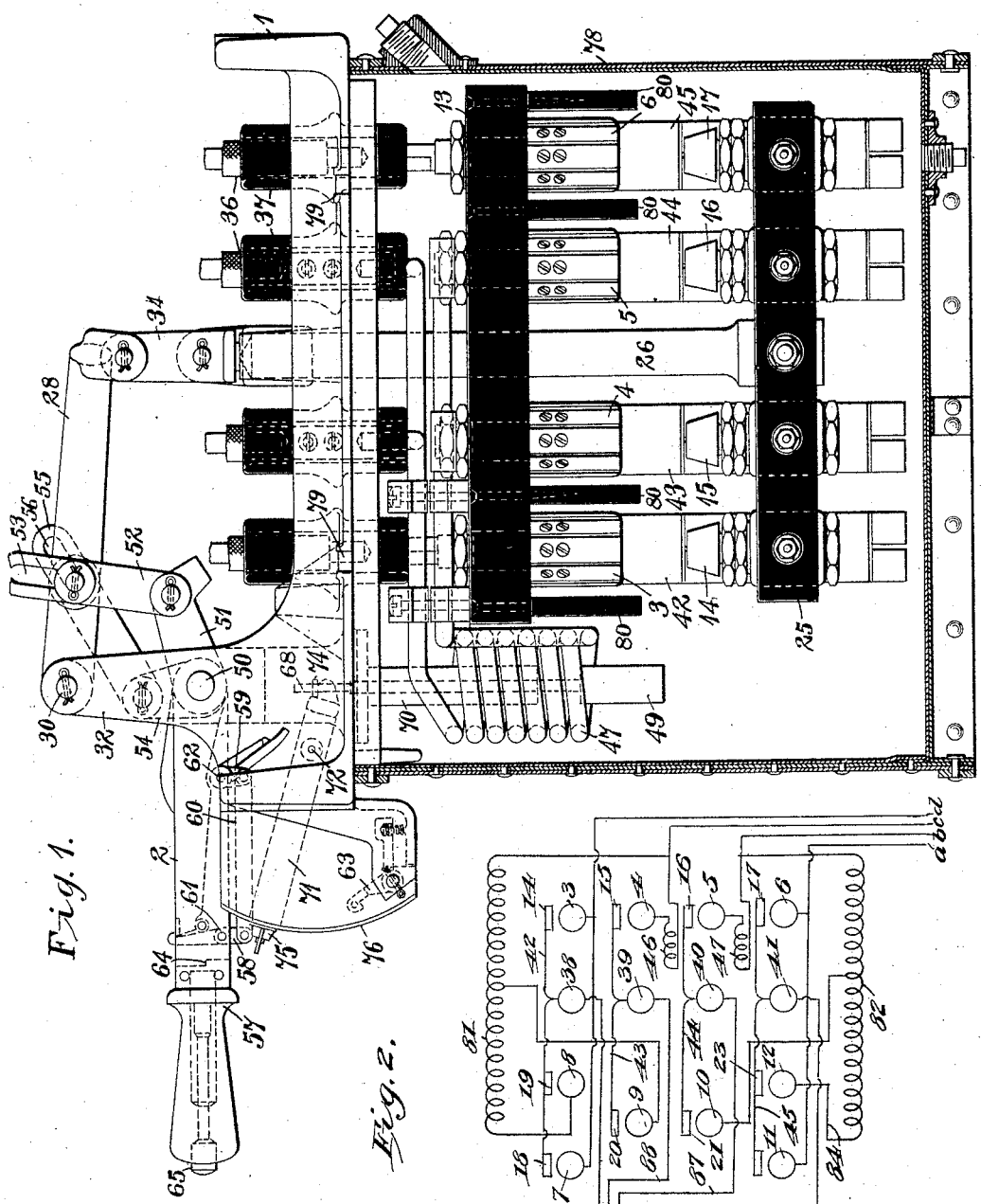

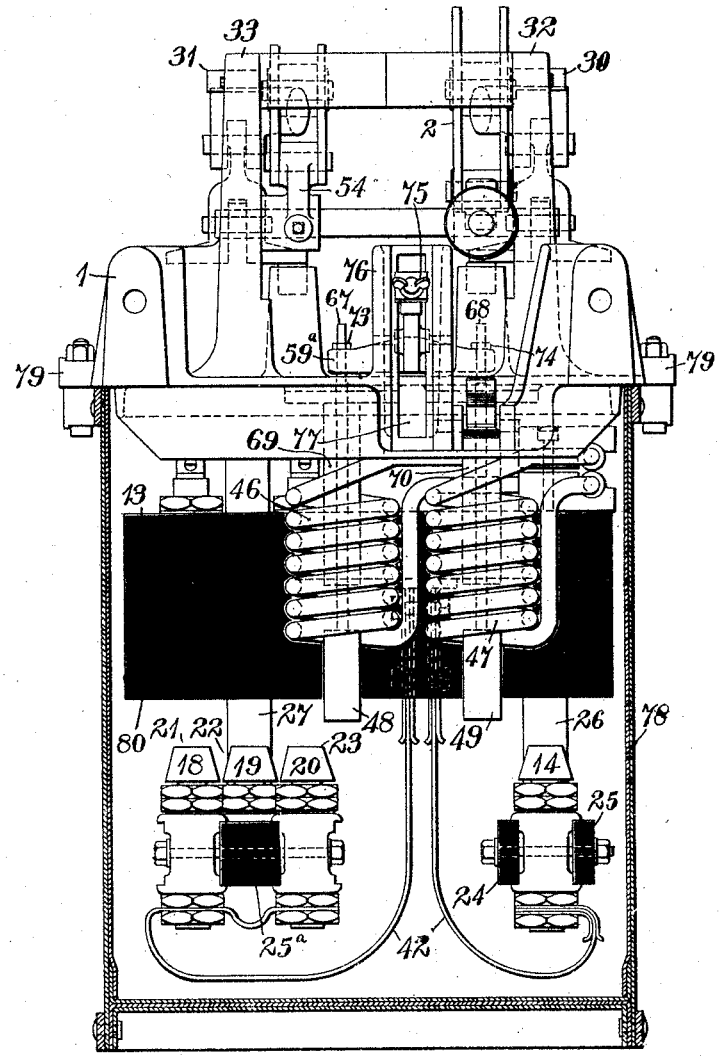

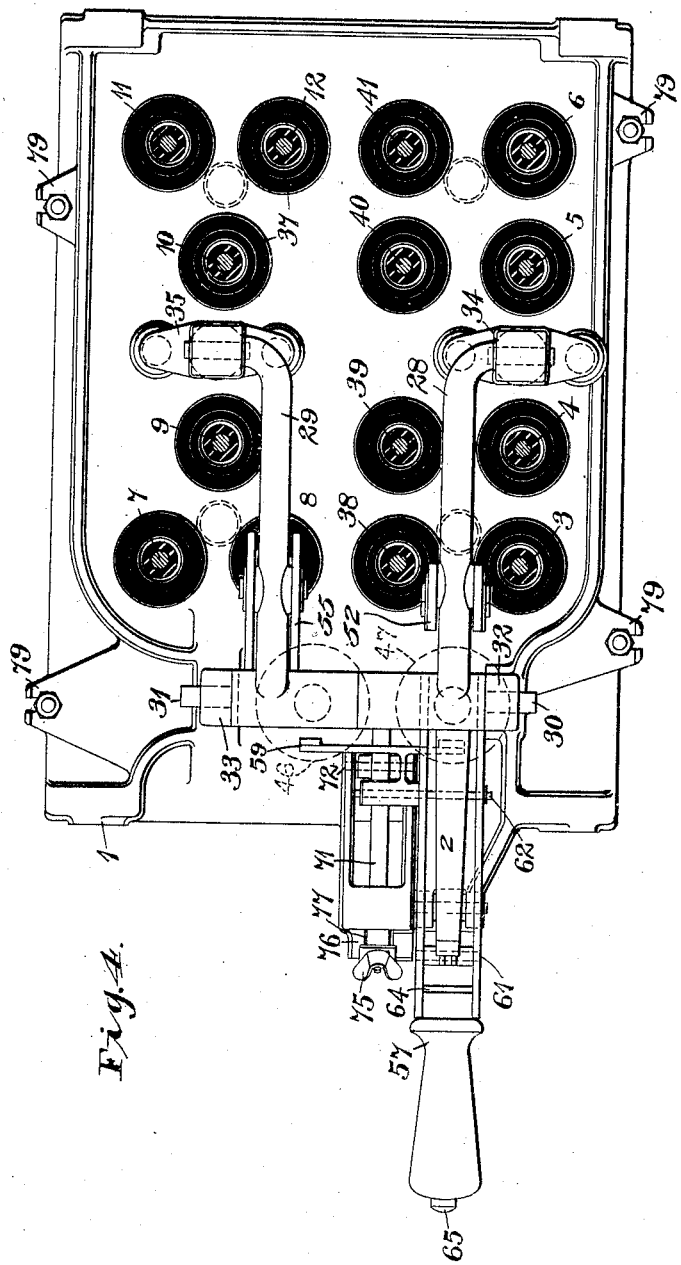

UNITED STATES PATENT OFFICE.

CHRISTIAN AALBORG, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-CIRCUIT CONTROLLER.

No. 879,234.     Specification of Letters Patent.     Patented Feb. 18, 1908.

Application filed April 4, 1906. Serial No. 309,929.

*To all whom it may concern:*

Be it known that I, CHRISTIAN AALBORG, a citizen of the United States, and a resident of Wilkinsburg, in the county of Allegheny and State of Pennsylvania, have invented a new and useful Improvement in Electric-Circuit Controllers, of which the following is a specification.

My invention relates to electric circuit controllers and has special reference to such devices as are adapted for effecting suitable circuit connections for starting and operating electric motors of the induction type.

The object of my invention is to provide a circuit controller of the class above indicated that shall be simple and durable in construction; that shall be adapted for relatively high voltage and large current operation and that shall act as an automatic circuit-interrupter under predetermined conditions when it occupies a motor-running position.

Devices adapted for controlling the circuit connections of induction motors have usually comprised a rotatable contact-carrying drum and a plurality of engaging contact fingers therefor which were connected to various intermediate taps in a transformer winding or to other voltage-regulating means, but such a construction may only be used for relatively low-voltage service since the distance of separation between the contacts is limited to short arcs on the surface of the drum.

For the control of induction motors of large size and high voltage, it is desirable to have a controlling device which may be mounted on the back and operated from the face of a switchboard and may serve to automatically open the circuit under overload or other predetermined conditions when the controller occupies its motor-running position.

In order to effect the aforesaid objective results, I provide a manually-operated circuit controller which is adapted to occupy a motor-starting and a motor-running position and which comprises a plurality of oil-immersed, stationary and movable contact members which are separated by a considerable distance when the circuit is interrupted.

The operating mechanism of my controller is so arranged that a relatively slight motion of the operating lever in one direction effects suitable connections for starting the motor while a similar movement in the opposite direction effects suitable connections for running the motor. A tripping magnet coil is adapted to interrupt the circuit under overload conditions and is located within the fluid-containing tank which surrounds the contact members. This magnet is so arranged that the value of current at which it operates may be adjusted from the face of the switchboard. It will be observed that in this device the principal advantages of a relatively high-voltage, oil-immersed circuit-breaker are combined with the usual circuit-controlling functions of a motor-starting switch.

My invention is illustrated in the accompanying drawings, in which

Figure 1 is a side elevation, and Fig. 2 a diagrammatic view of the circuit connections of a circuit controller constructed in accordance therewith, the fluid-containing tank being broken away to disclose the engaging contact members. Fig. 3 is an end elevation and Fig. 4 a plan view of the device shown in Figs. 1 and 2.

Referring to the drawings, the circuit-interrupter illustrated therein comprises a supporting frame 1 of suitable material, an operating lever 2 and a plurality of stationary contact members, 3, 4, 5, 6, 7, 8, 9, 10, 11 and 12 which are mounted upon an insulating plate 13, the members 3, 4, 5 and 6 being engaged by a group of movable contact members 14, 15, 16 and 17, and the members 7, 8, 9, 10, 11 and 12 being engaged by another group of movable contact members 18, 19, 20, 21, 22 and 23. The stationary contact members are substantially alike and may be of any well known construction comprising, as illustrated, flexible sockets built up of strips of conducting material which are attached to cylindrical blocks to extend downwardly therefrom and are bent inwardly and upwardly to form resilient engaging surfaces for the outer conical surfaces of the movable members. The movable members are substantially alike and comprise supporting members which are rigidly attached to insulating bars 24, 25 and 25$^a$, and contact members which are so attached to the supporting members as to permit a considerable lateral motion in order that a good contact may be maintained between the stationary sockets and the movable cone-shaped contact members when they are in engagement. The insulating bars 24 and 25 support one of the groups of movable contact members and are attached to a rod 26 while the bar 25$^a$ supports the other group of movable contact members and is attached to a rod 27. The upper extremities of the rods 26 and 27 are connected, by means of links 34 and 35, to levers 28 and 29 which are fulcrumed upon shafts 30 and 31 that have bearings in projections 32 and 33 upon the frame 1.

A plurality of terminal pieces 36 are mounted in insulating bushings 37 which are supported by the frame 1 and may be connected, above the plate 13, to suitable motor and supply line conductors, and below the plate are connected to the several stationary contact members, and one group, comprising terminals 38, 39, 40 and 41, are respectively connected to the movable contact members 14, 18 and 19; 15 and 20; 16 and 21; and 17, 22 and 23 by flexible conductors 42, 43, 44 and 45.

Although the number and arrangement of terminals and contact members, as illustrated, are adapted for starting and operating two-phase motors, any suitable number and arrangement of terminals may be employed for various other purposes. Two terminals in the running group, which are connected to different phase circuits of the motor, are connected to their respective stationary contact members through similar electro-magnet coils 46 and 47. These coils are adapted to actuate movable core members 48 and 49 to interrupt the circuit when the current of either phase exceeds a predetermined amount.

The operating lever 2 is fulcrumed by means of a shaft 50 to which it is rigidly attached and is provided with a projection 51 which is connected to lever 28 by a link 52. A lost motion connection is provided between the link 52 and the lever 28 by means of a slot 53 near one end of the link. A crank arm 54 is attached to the shaft 50 at a point below the lever 29 and projects therefrom in a line which is substantially perpendicular to the plane that includes the shaft and the projection 51. The outer end of the crank arm 54 is connected to the lever 29 at the point corresponding to the point of connection between the link 52 and the lever 28 by a link 55 which is provided with a slot 56, similar to the slot 53 in the link 52.

Since the crank arm 54 is rigidly fixed to the shaft 50 to which the lever 2 is attached, movement of the lever causes the crank arm and the projection 51 to rotate through a small angle. The lengths of the links 52 and 55 and the arrangement of parts are such that movement of the lever 2 through a relatively small angle in an upward direction serves merely to take up the lost motion in the link 52 but causes the lever 29 to move to a position above the shaft 31 and to raise the starting group of movable contact members 18, 19, 20, 21, 22 and 23, into engagement with the coöperating, stationary contact terminals, while movement of the lever 2 in the opposite direction through the same angle takes up the lost motion in the link 55 and serves to move the lever 28 to raise the running group of movable contact members 14, 15, 16 and 17 into engagement with their coöperating, stationary contact terminals.

A handle lever 57 is rotatably mounted upon the shaft 50 and is provided with a latch 58, the extremity of which is notched to engage the outer end of the lever 2. The handle lever comprises two parallel strips in order to avoid interference with the motion of the lever 2 and is provided with a small bell crank 59 which is connected to the lower extremity of the latch 58 by a connecting link 60, so that an inconsiderable motion of the bell crank may serve to disengage the latch from the extremity of the lever 2. The latch 58 and the bell crank 59 are respectively fulcrumed upon pin shafts 61 and 62, which are attached to the handle lever 57. A stationary latch 63 is mounted upon a projection of the frame 1 and is adapted to engage a notch 64 on the handle lever 57 when the latter has been moved down into its extreme position so that, when the latch 58 engages the lever 2, the controller may be held in its running position by means of the stationary latch 63. The latch 63 may be disengaged from the notch 64 on the handle lever by a push pin 65 that is located in a tubular opening in the outer extremity of the handle lever.

A cross strip 59$^a$ is attached to one arm of the bell crank 59 so that when the coils 46 and 47 are sufficiently energized and the switch occupies its motor-running position it may be engaged by hammer rods 67 and 68 which are attached to the movable core members 48 and 49. By this arrangement, the action of either tripping magnet may interrupt the circuit when the controller occupies its motor-running position irrespective of the fact that the handle lever may only be released manually by the push pin 65.

The value of current, at which the tripping magnets will operate may be determined by the distance of separation between the movable core members 48 and 49 and stationary core members 69 and 70, around which the coils 46 and 47 are wound. Adjustment of the position of the members 48 and 49 may be effected by means of a lever 71 that is fulcrumed upon a shaft 72 and is adapted to engage nuts 73 and 74 on the upper ends of the hammer rods 67 and 68.

The outer end of the lever 71 may be clamped in any suitable position by a thumb screw 75, which engages the outer surface of a curved plate 76 having a slot 77 through which the lever projects. A fluid-containing tank 78 surrounds the contact members and the tripping magnet coils.

The circuit connections for and the operation of the controller may be traced and understood by reference to Fig. 2 of the drawings. Assuming that the controller occupies its starting position so that contact members 18, 19, 20, 21, 22 and 23 engage members 7, 8, 9, 10, 11 and 12; electric current is supplied from any suitable source through conductors $a$, $b$, $c$ and $d$ and transformers 81 and 82 to an electric motor 83. The following circuits are established: One from conductor $a$ through contact members 11, 22, 23 and 12 and conductor 84 to one end of transformer 82; also, from conductor $a$ through contact members 11, 22 and 41 and conductor 85 to motor terminal A; one from conductor $b$ to the opposite end of transformer 82; one from conductor $c$ to one end of transformer 81, and one from conductor $d$ through contact members 7, 18, 19 and 8 to the opposite end of transformer 81 and also from conductor $d$ through contact members 7, 18 and 38 and conductor 86 to motor terminal D. The motor terminals B and C are respectively connected through conductors 87 and 88, contact members 40, 21 and 10 and 39, 20 and 9 to intermediate or low-voltage taps in the transformers 82 and 81. It will be observed that the overload release magnet coils 46 and 47 are not included in the starting circuits. If the controller is now moved to occupy its motor running position, contact members 14, 15, 16 and 17 engaging members 3, 4, 5 and 6, circuits are established from conductor $a$ through contact members 6, 17 and 41 and conductor 85 to motor terminal A; from conductor $b$ through magnet winding 47, contact members 5, 16 and 40 and conductor 87 to motor terminal B; from conductor $c$ through magnet winding 46, contact members 4, 15 and 39 and conductor 88 to motor terminal C, and from conductor $d$ through contact members 3, 14 and 38 and conductor 86 to motor terminal D. Thus, the motor circuits are automatically protected against overload under running conditions, but are not interrupted by the usual rush of current which occurs when the motor is first started.

The frame 1 is provided with projections 79 by which it may be suspended from a bracket or other suitable supporting means provided on the back of a switchboard. The handle lever 57 and the adjusting lever 71 may preferably be arranged to project through openings in the switchboard so that the operation and adjustment of the interrupter may be effected from the face of the board while all current-carrying parts are located at the back of the board. The handle lever may only be held in the motor-starting position manually in order to prevent an attendant from leaving the controller in this position, since there is no automatic circuit-interrupting device which is operative in this position.

The attendant must move the controller to the motor-running position where it is held by the action of the stationary latch. The various stationary contact members may preferably be separated by insulating barriers 80, which project downward from the insulating plate 13 to which they may be attached by any convenient means. By employing a flexible shunt to connect the movable contact members directly to stationary terminal members the total number of contact members and terminals is materially reduced.

I desire that my invention shall not be confined to the arrangement shown and described and that variations in size, form and arrangement of details which effects similar results shall be included in its scope.

I claim as my invention:

1. In a circuit controller, the combination with stationary terminals, flexible conductors connected thereto, groups of stationary contact members, corresponding groups of movable contact members which may engage said stationary members and which are connected to the extremities of said flexible conductors, of means for selecting and actuating one group of the movable members into and out of engagement with the corresponding stationary members.

2. In a circuit controller, the combination with stationary terminal members, stationary contact members, movable contact members which are adapted to engage said stationary contact members and which are connected to said terminal members by flexible conductors, of an operating lever which is so connected to the movable contact members that movement of the lever through a relatively small angle in one direction moves certain of the contact members into engagement with their complementary stationary members, and a similar movement in the reverse direction moves the other movable members into engagement with their complementary stationary members.

3. In a circuit controller, the combination with stationary terminals, flexible conductors connected thereto, stationary contact members, movable contact members which may engage said stationary members and which are connected to the extremities of said flexible conductors, of a pair of similar levers which are connected to a pair of insulating strips upon which the movable contact members are mounted and an operating lever which is so connected to the pair of similar levers that movement thereof through a relatively small angle in one direction operates one of said levers while movement thereof through a similar angle in a reverse direction operates the other of said levers.

4. In a circuit controller, the combination with a plurality of stationary contact members, two groups of movable contact members which are adapted to engage the stationary members, of operating means for said movable groups that comprises a pair of similar operating levers that are fulcrumed near their extremities, insulating rods connecting said levers to the movable groups, a crank shaft that is substantially parallel to the fulcrum shaft of the levers, two cranks attached thereto substantially at right angles to each other, links connecting the extremities of the cranks to intermediate points on the levers, and means for rotating the crank shaft to operate the levers.

5. In a circuit controller, the combination with a plurality of stationary contact members, two groups of movable contact members which are adapted to engage the stationary members, of operating means for said movable groups comprising a pair of similar operating levers that are fulcrumed near their extremities, insulating rods connecting said levers with the movable groups, a crank shaft that is substantially parallel to the fulcrum shaft of the levers, two cranks attached thereto substantially at right angles to each other, links connecting the extremities of the cranks to intermediate points on the levers, and an operating handle lever which may effect the rotation of the crank shaft to operate the levers, and means for automatically disconnecting the crank shafts from the handle lever under predetermined conditions.

6. In a controller for electric motors, the combination with a plurality of stationary contact members that are divided into two groups, of two groups of movable contact members, and an operating lever therefor which may effect the engagement of either group of movable members with its corresponding stationary group.

7. In a controller for electric motors, the combination with a plurality of stationary terminal members, two groups of movable contact members that are connected thereto by flexible conductors, of two groups of stationary contact members which may be engaged by the respective movable groups and which are adapted to effect circuits for starting and running an electric motor.

8. In an electric circuit controller, the combination with a plurality of stationary terminal members, two groups of movable contact members which are attached thereto by flexible conductors, corresponding groups of stationary contact members which may be engaged by groups of movable members, similar operating levers by which the movable groups may be moved into and out of engagement with the stationary groups, of a single actuating lever, a relatively slight motion of which in one direction will move one group of movable contact members into engagement with its complementary stationary group and a similar motion of which in the opposite direction will move the other group of movable contact members into engagement with its stationary group.

9. In an electric circuit controller, the combination with a plurality of stationary terminal members, two groups of movable contact members which are attached thereto by flexible conductors, corresponding groups of stationary contact members which may be engaged by groups of movable contact members, similar operating levers by which the movable groups may be moved into and out of engagement with the stationary groups, a single actuating lever, a relatively slight motion of which in one direction will move one group of movable contact members into engagement with its complementary stationary group and a similar motion of which in the opposite direction will move the other group of movable contact members into engagement with its stationary group, of means for fastening said actuating lever in one of its extreme positions and means for automatically opening, under predetermined conditions, the circuits that are closed when the actuating lever occupies said position.

10. In a controller for electric motors, the combination with a plurality of stationary terminals, and oil-immersed contact members attached thereto, of a plurality of movable complementary contact members which are divided into two groups to respectively effect the starting and the running of the motor, an operating handle that is confined to a predetermined arc of rotation and occupies a mid position when all the movable contact members are out of engagement with the stationary members, one extreme position when one group of contact members is in engagement with its stationary members and the opposite extreme position when the other group engages its stationary members.

11. In a controller for electric motors, the combination with a plurality of stationary terminals, and oil-immersed contact members attached thereto, of a plurality of movable complementary contact members which are divided into two groups to respectively effect the starting and running of the motor, an operating handle that is confined to a predetermined arc of rotation and occupies a mid position when all the movable contact members are out of engagement with one group of contact members, one extreme position when one group is in engagement with its stationary members and the opposite extreme position when the other group engages its stationary members, and automatically returns the controller to the open circuit position under predetermined conditions that exist only when the controller occupies the motor-running position.

In testimony whereof, I have hereunto subscribed my name this 30th day of March, 1906.

CHRISTIAN AALBORG.

Witnesses:
FRANK CONRAD,
BIRNEY HINES.